United States Patent Office 3,255,213
Patented June 7, 1966

3,255,213
PREPARATION OF DICARBOXYLIC
ANHYDRIDES
Ralph O. Kerr, Houston, Tex., assignor to Petro-Tex Chemical Corporation, Houston, Tex., a corporation of Delaware
No Drawing. Filed Apr. 19, 1963, Ser. No. 274,350
12 Claims. (Cl. 260—346.8)

This invention relates to an improved process for the manufacture of dicarboxylic acid anhydrides by catalytic oxidation of ethylenically unsaturated hydrocarbons and relates more particularly to an improved process for producing monoethylenically unsaturated aliphatic dicarboxylic acid anhydrides such as maleic anhydride by reacting a mixture of an oxygen-containing gas and an ethylenically unsaturated hydrocarbon in vapor phase in the presence of a novel catalyst therefor.

Production of dicarboxylic acid anhydrides by vapor phase catalytic oxidation of hyrocarbons is well known. The principal method currently employed for making maleic anhydride is by the catalytic oxidation of benzene in the presence of certain heavy metal oxide catalysts. However, it would be desirable to be able to produce maleic anhydride from the readily available aliphatic hydrocarbons such as butene. Although processes for the oxidation of unsaturated aliphatic hydrocarbons are reported in the literature, there are certain defects of these processes such as short catalyst life and low yields of product. More efficient catalysts for the conversion of the hydrocarbons to maleic anhydride are desirable.

In copending applications I have described improved catalysts for the production of maleic anhydride from olefins. These catalysts comprise vanadium and phosphorus in particular ratios combined as a complex. The processes using the vanadium-phosphorus catalysts provide high yields of maleic anhydride as well as other advantages. However, it is a continuing object to improve these catalysts. One objective is to reduce the quantity of undesirable by-products. Certain aliphatic by-products of the reaction such as acetic acid, propionic acid, acetaldehyde, acrolein and crotonaldehyde are objectionable particularly because of the pungent smell and other irritating characteristics of these compounds. The presence of large amounts of these impurities necessitates a complex purification scheme. It is one of the principal objects of this invention to reduce the quantity of weak acids and carbonyls in the effluent gases from the reactor.

It is accordingly an object of this invention to provide an improved process for obtaining high yields of dicarboxylic acid anhydrides by vapor phase oxidation of olefins. It is another object of this invention to provide an improved process for the vapor phase oxidation of monoolefins, particularly butene-2 to maleic anhydride. It is a further object of this invention to provide a novel and improved catalyst useful in obtaining increased yield of product by vapor phase catalytic oxidation of olefins to aliphatic dicarboxylic acid anhydrides, and a method for making the same. Another object is to provide a process for the oxidation of aliphatic hydrocarbons to maleic anhydride with a minimum amount of undesirable by-products such as weak acids and aliphatic carbonyl compounds. An additional object is to provide a process which will produce acid anhydrides at high flow rates of aliphatic hydrocarbon through the reaction zone. Still another object is to produce catalysts of long life. Other objects and advantages of the invention will be apparent from the description thereof which follows.

It has now been found that these objectives may be accomplished by the use of a particular vanadium-oxygen-phosphorus complex type catalyst containing a minor amount of copper. The catalysts contain vanadium, phosphorus, copper and oxygen chemically bonded together as a complex. The atomic ratio of the phosphorus, vanadium and copper should be present in relative proportions of about 1 atom of vanadium to about 1.1 to 1.8 or 2.5 atoms of phosphorus to about 0.005 to 0.3 atom of copper. The preferred proportions are from about 1.0 atom of vanadium to 1.2 to 1.6 atoms of phosphorus to about 0.04 to 0.20 atom of copper. The atomic ratio of oxygen to the remaining components of the catalyst, when the catalyst is being used to catalyze the oxidation, is difficult to determine and is probably not constant due to the competing reactions of oxidation and reduction taking place during the reaction at the high temperatures.

The catalysts containing vanadium, phosphorus and copper will preferably also contain a fourth metal component. The preferred fourth component will be an element or compound thereof of Group Ia of the Periodic Table.* The Group Ia elements are the alkali metals including lithium, sodium, potassium, rubidium, cesium and francium. The function of the Group Ia element is no completely understood but superior results are obtained when the catalysts contain these elements. One advantage is the life of the catalysts is increased with this increased life being due at least partially to the stabilizing effect of the alkali on the phosphorus and copper.

The atomic ratio of the total atoms of Group Ia elements to phosphorus should be between about 0.003 and 0.2 atom of Group Ia elements per atom of phosphorus. The best results have been obtained when the ratio of Group Ia atoms to phosphorus atoms has been from about 0.01 to 0.06 or 0.1 atom of elements of Group Ia per atom of phosphorus. When the Group Ia atom is introduced into the catalyst preparation in the form of a compound, for example, as lithium hydroxide or potassium chloride, the weight of the Group Ia metal compound will ordinarily be from about 0.05 to about 5.0 weight percent of the total weight of the vanadium, phosphorus and oxygen.

The catalyst may be prepared in a number of ways. A preferred method to obtain catalysts which produce high yields of maleic anhydride upon oxidation of olefins is whereby the catalyst complex is formed in solution and deposited as a solution onto a carrier. According to one preferred solution method, the vanadium is present in solution with an average valence of less than plus 5 in the finally formed complex in solution. Preferably, the vanadium has an average valence of less than plus 5 at the time the solution of catalyst complex is deposited onto the carrier, if a carrier is used. Also preferably the complex is formed by reacting a solution of vanadium cations, wherein the vanadium has a valence of about plus 4, with phosphorus which is contained in an anion such as $PO_4^{-3}$. The solution of vanadium catalyst may be obtained by reducing a compound such as $V_2O_5$ in a reducing solvent or by dissolving a compound such as vanadyl (IV) chloride. The vanadium compound may be dissolved in a reducing solvent, which solvent functions not only to form a solvent for the reaction, but also to reduce the valence of the vanadium compound to a valence of less than 5. For example, a vanadium compound, phosphorus compound and copper compound may be dissolved in any order in a suitable reducing solvent and the formation of the complex allowed to take place. Preferably the vanadium compound is first dissolved in the solvent and thereafter the phosphorus and copper compounds are added. The reaction to form the complex may be accelerated by the application of heat. The deep blue color of the solution shows the ---
\* These groups are based on the long form of the Periodic Classification of the elements as found in Smith's Introductory College Chemistry, 3rd Edition, by William F. Ehret (Appleton-Century-Crofts, Inc., 1950).

vanadium has an average valence of less than 5. The complex formed is then, without a precipitation step, deposited as a solution onto a carrier and dried. In this preferred procedure, the vanadium has an average valence of less than plus 5 at the time it is deposited onto the carrier. Generally, the average valence of the vanadium will be between about plus 2.5 and 4.6 at the time of deposition onto the carrier, and preferably will be between 3.5 and 4.3.

When the above described preferred solution method is employed, reducing agents for the vanadium may be either organic or inorganic. Acids such as hydrochloric, hydroiodic, hydrobromic, acetic, oxalic, malic, citric, formic and mixtures thereof such as a mixture of hydrochloric and oxalic may be used. Sulphur dioxide may be used. Less desirably, sulfuric and hydrofluoric acids may be employed. Other reducing agents which may be employed, but which have not given as desirable catalysts are organic aldehydes such as formaldehyde and acetaldehyde; alcohols such as pentaerythritol, diacetone alcohol and diethanol amine, and additional reducing agents such as hydroxyl amines, hydrazine, and nitric oxide. The reducing solvents will preferably be aqueous solutions of aliphatic compounds of 1 to 6 carbon atoms, HCl, HI, HBr and mixtures thereof. Nitric acid and similar oxidizing acids which would oxidize the vanadium from a valence of 4 to 5 during the preparation of the catalyst should be avoided. The reducing agents may form oxysalts of vanadium. For example, if $V_2O_5$ is dissolved in hydrochloric or oxalic acid, the corresponding vanadium oxysalts are produced. These vanadium oxysalts should have as the salt forming anion an anion which is more volatile than the phosphate anion.

The time at which the copper compound and alkali compound, if included, is incorporated into the solution is not critical so long as it is in solution before the catalyst complex is coated onto the carrier. The copper and alkali compounds may be added after the vanadium compound and the phosphorus compound have been reacted or the copper and alkali compounds may be added either before, at the same time, or after either the vanadium or phosphorus compounds has been added. The alkali compound and copper do not have to be added at the same time.

The catalyst complex containing vanadium, phosphorus and copper may be formed by simply causing the combination of each of the ingredient components in a solution or dispersion. Heat may be applied to accelerate the formation of the complex and one method of forming the complex is by causing the ingredients to react under reflux conditions. Under reflux conditions this solution reaction generally takes about one to two hours.

Any vanadium phosphorus and copper compounds may be used as starting materials which when the compounds are combined and heated to dryness in air at a temperature of, for example, 350° C. will leave as a deposit a catalyst complex having relative proportions within the above described ranges. Preferred are vanadium, phosphorus and copper compounds which are essentially completely soluble under standard conditions of 760 mm. of mercury in boiling aqueous hydrochloric acid, containing 37 weight percent hydrochloric acid. Generally, phosphorus compounds are used which have as the cation an ion which is more volatile than the phosphate anion. Various compounds may be used, such as metaphosphoric acid, triphosphoric acid, pyrophosphoric acid, ortho-phosphoric acid, phosphoruspentoxide, phosphorus oxyiodide, ethyl phosphate, methyl phosphate, amine phosphate, phosphorus pentachloride, phosphorus trichloride, phosphorus oxybromide, and the like.

Suitable vanadium compounds useful as starting materials are compounds such as vanadium pentoxide, ammonium metavanadate, vanadyl chloride, vanadyl dichloride, vanadyl trichloride, vanadium sulfate, vanadium phosphate, vanadium tribromide, vanadyl formate, vanadyl oxalate, metavanadic acid, pyrovanadic acid, and the like. Generally, any vanadium compound which has an anion which is either the phosphate anion or is more volatile than the phosphate anion is satisfactory.

Suitable copper compounds are the various compounds such as the copper halides, phosphates, oxides, carbonates, sulfates, nitrates, acetates, hydrides, and so forth. Metallic copper may be used. Generally copper compounds are used which either have the phosphate anion as the anion or which have an anion which is more volatile than the phosphate anion. Copper compounds which are soluble in hydrochloric acid are preferred. Compounds such as cuprous oxide, cupric oxide, cuprous chloride, cuprous sulfate, cuprous or cupric sulfide, cupric lactate, cupric nitrate, cupric phosphate, cuprous bromide, cuprous carbonate, cupric sulfate, cupric oxychloride, cuprous hydroxide, cuprous sulfite, cupric acetate, and the like, are useful as starting materials. Mixtures of the various vanadium, phosphorus and copper compounds may be used as starting materials to form the described catalyst complex.

The alkali metal may suitably be introduced by employing alkali metal compounds such as alkali metal salts with examples being lithium acetate, lithium bromide, lithium carbonate, lithium chloride, lithium hydroxide lithium iodide, lithium oxide, lithium sulfate, lithium orthophosphate, lithium meta-vanadate, potassium sulfate, potassium chloride, potassium hydroxide, sodium chloride, sodium hydroxide, rubidium nitrate, cesium chloride and the like. Mixtures of two or more alkali metal compounds may be used, such as a mixture of lithium hydroxide and sodium chloride or a mixture of lithium chloride and potassium chloride. The preferred alkali metal elements are lithium, sodium and potassium, and mixtures thereof, with lithium being particularly preferred. The alkali metal compound will preferably be an alkali metal compound which either has a phosphate anion as the anion, that is a compound such as lithium phosphate, or a compound which has an anion which is more volatile than the phosphate anion.

Another example of the preparation of the catalyst complex is to dissolve the copper compound and a vanadium compound such as ammonium metavanadate or vanadium pentoxide in an aqueous solution of phosphoric acid. After the components have been dissolved the solution is heated until precipitation occurs. The precipitant can then be dried and used as a catalyst or a carrier may be combined with the liquid phase either before or after the precipitation.

Inert diluents such as silica may be present in the catalyst, but the combined weight of the vanadium, oxygen, phosphorus, copper and alkali metal, if employed, should preferably constitute at least about 50 weight percent of the catalyst surface exposed to the reaction gases, and preferably these components constitute at least about 75 weight percent of the catalyst surface and more preferably at least about 95 weight percent.

Although the catalysts may be separately formed and used as pellets, it is preferred to deposit this material on a carrier such as aluminum oxide or silica. Before the carrier is combined with the catalyst the solution of catalyst is preferably concentrated to a solution which contains from about 30 to 80 percent volatiles, and better results have been obtained when there is from about 50 to 70 percent volatiles by weight. The carrier may be added to the catalyst solution or dispersion or the catalyst solution or dispersion may be poured onto the carrier. Less desirably, the alundum or other carrier may be present during the whole course of reactions to provide the desired vanadium - oxygen - phosphorus - copper complex. After the catalyst complex has been coated onto the carrier, the catalyst may be converted to a more active form by heating in the presence of an oxidizing gas.

The support or carrier for the vanadium-oxygen-phosphorus-copper complex, if a carrier is used, should preferably be inert to both the depositing solution containing the complex and preferably should be inert under the catalytic oxidation conditions. The support provides not only the required surface for the catalyst, but gives physical strength and stability to the catalyst material. The carrier or support normally has a low surface area, as usually measured, from about 0.001 to about 5 square meters per gram. A desirable form of carrier is one which has a dense non-absorbing center and a rough enough surface to aid in retaining the catalyst adhered thereto during handling and under reaction conditions. The carrier may vary in size but preferably is from about 2½ mesh to about 10 mesh in the Tyler Standard screen size. Alundum particles as large as ¼ inch are satisfactory. Carriers much smaller than 10 to 12 mesh normally cause an undesirable pressure drop in the reactor. Very useful carriers are alundum and silicon carbide or carborundum. Any of the Alundums or other inert alumina carriers of low surface may be used. Likewise, a variety of silicon carbides may be employed. Silica gel may be used. The amount of the catalyst complex on the carrier is usually in the range of from about 10 to about 30 weight percent of the total weight of complex plus carrier and more preferably from about 14 to about 24 weight percent on an inert carrier such as alundum. The amount of the catalyst complex deposited on the carrier should be enough to substantially coat the surface of the carrier and this normally is obtained with the ranges set forth above. With more absorbent carriers, larger amounts of material will be required to obtain essentially complete coverage of the carrier. Excess catalyst over that required to coat the carrier surface is not necessary and usually will be lost by mechanical attrition. The final particle size of the catalyst particles which are coated on a carrier will also preferably be about 2½ to about 10 mesh size. The carriers may be of a variety of shapes, the preferred shape of the carriers is in the shape of cylinders or spheres. Although more economical use of the catalyst on a carrier in fixed beds is obtained, the catalyst may be employed in fluid bed systems. Of course, the particle size of the catalyst used in fluidized beds is quite small, varying from about 10 to about 150 microns and in such systems the catalyst normally will not be provided with a carrier but will be formed into the desired particle size after drying from solution. Therefore, the particle size may suitably range from about 10 microns to about ¼ inch or longer in the greatest dimension.

Prior to use, the catalytic material may be placed in the reactor used to convert an olefin such as butene-2 to maleic anhydride and may, for example, be conditioned by passing butene-2 in a low concentration of butene-2 in air over the catalyst. In a typical, but non-limiting, example the temperature may be slowly raised over a period of 72 hours, to about 350° C. to 550° C. Thereafter, butene-2 in air may be passed over the catalyst, for example, at a concentration of about 1.2 mole percent butene-2 at the rate of 100 grams butene-2 per liter of catalyst per hour and the maleic anhydride product collected from the gaseous effluent from the reactor. Of course, the maleic anhydride produced may be collected beginning at the start of the conditioning period if desired. The reaction requires only passing the olefin in low concentrations in air over the described catalyst.

The flow rate of the gaseous stream through the reactor may be varied within rather wide limits, but a preferred range of operations is at the rate of about 50 to 300 grams of olefin per liter of catalyst per hour and more preferably about 100 to about 250 grams of olefin per liter of catalyst per hour. Residence times of the gas stream will normally be less than about 2 seconds, more preferably less than about 0.5 second. The residence time is the calculated dwell time in the reactor space, with the reactor space being defined as the void space portion of the reactor containing catalyst at a temperature of at least 350° C.

A variety of reactors will be found to be useful such as multiple tube heat exchanger type reactors or fluid bed reactors. If a tubular reactor is employed, the tubes of such reactors may conveniently vary in diameter from about ¼ inch to about 3 inches, and the length may be varied from about 3 to about 10 or more feet. The oxidation reaction is an exothermic reaction and, therefore, relatively close control of the reaction temperature should be maintained. It is desirable to have the surface of the reactors at a relatively constant temperature and some medium to conduct heat from the reactors is necessary to aid temperature control. Such media may be Woods metal, molten sulfur, mercury, molten lead, and the like, but it has been found that eutectic salt baths are completely satisfactory. One such salt bath is a sodium nitrate-sodium nitrite-potassium nitrate eutectic constant temperature mixture. An additional method of temperature control is to use a metal block reactor whereby the metal surrounding the tube acts as a temperature regulating body. As will be recognized by the man skilled in the art, the heat medium will be kept at the proper temperature by heat exchangers and the like. The reactor or reaction tubes may be iron, stainless steel, carbon-steel, nickel, glass tubes such as Vycor and the like. Both carbon-steel and nickel tubes haxe excellent long life under the conditions of the reactions described herein. Normally, the reactors contain a preheat zone of an inert material such as ¼ inch Alundum pellets, inert ceramic balls, metal balls or chips and the like. Conveniently the preheat zone will comprise about one-half to one-fourth the volume of the active catalyst present, although it is not essential to have any preheat zone.

The temperature of reaction may be varied within some limits, but normally the reaction should be conducted at temperatures within a certain range. The oxidation reaction is exothermic and once reaction is underway, the main purpose of the salt bath or other media is to conduct heat away from the walls of the reactor and control the reaction. Better operations are normally obtained when the reaction temperature employed is no greater than about 100° C. above the salt bath temperature, under a given set of conditions. The temperature in the reactor, of course, will also depend to some extent upon the size of the reactor and the olefin concentration. Under usual operating conditions, in compliance with the preferred procedure of this invention, the temperature in the center of the reactor, measured by thermocouple, is about 375° C. to about 550° C. The range of temperature preferably employed in the reactor, measured as above, should be from about 400° C. to about 515° C. and the best results are ordinarily obtained at temperatures from about 420° C. to about 500° C. Described another way, in terms of salt bath reactors with carbon steel reactor tubes, about 1.0 inch in diameter, the salt bath temperature should be controlled between about 350° C. to about 550° C. Under normal conditions, the temperature in the reactor ordinarily should not be allowed to go above about 550° C. for extended lengths of time because of decreased yields and possible deactivation of the novel catalyst of this invention.

The pressure on the reactor is not generally critical, and the reaction may be conducted at atmospheric, super-atmospheric or below atmospheric pressure, and conveniently will be about atmospheric pressure.

The catalyst of the present invention and the process of using them are useful for the production af aliphatic dicarboxylic acid anhydrides from aliphatic hydrocarbons. Ethylenically unsaturated hydrocarbons of from 4 to 6 carbon atoms such as 3-methylbutene-1, isoprene, 2,3-dimethyl butadiene are useful starting materials. The preferred starting materials are the four carbon hydrocarbons such as butene-1, cis or trans butene-2 and butadiene-1,3 and mixtures thereof. Useful feeds as starting materials may be mixed hydrocarbon streams such as refinery streams. For example, the feed material may be the olefin containing hydrocarbon mixture obtained as the product from the dehydrogenation of hydrocarbons. Another source of feed for the present process is from refinery by-products. For example, in the production of gasoline from higher hydrocarbons by either thermal or catalytic cracking a predominantly $C_4$ hydrocarbon stream may be produced and may comprise a mixture of butenes together with butadiene, butane, isobutane, isobutylene and other ingredients in minor amounts. These and other refinery by-products which contain normal ethylenically unsaturated hydrocarbons are useful as starting materials. Although various mixtures of hydrocarbons are useful, the preferred hydrocarbon feed contains at least 70 weight percent butene-1, butene-2 and/or butadiene-1,3 and mixtures thereof, and more preferably contains at least 95 percent butene-1, butene-2 and/or butadiene-1,3 and mixtures thereof. Any remainder will be aliphatic hydrocarbons.

The gaseous feed stream to the oxidation reactors normally will contain air and about 0.5 to about 2.5 mole percent aliphatic hydrocarbons such as butene. About 1.0 to about 1.5 mole percent of the monoolefin are satisfactory for optimum yield of product for the process of this invention, although higher concentrations may be employed. The source of the oxygen may be pure oxygen or synthetic or natural mixtures of oxygen and inert gases such as nitrogen or helium may be used. Dry air is entirely satisfactory.

As mentioned above, when butene is oxidized to maleic anhydride in vapor phase, many undesirable by-products are produced. For example, weak acids, which are aliphatic monocarboxylic acids of 1 to 4 carbon atoms, are produced. The acid produced in greatest quantity is acetic acid, but other acids such as acrylic and crotonic acids are also produced. The carbonyl compounds produced are aliphatic monoaldehydes of 1 to 4 carbon atoms with the principal aldehyde being acrolein together with smaller quantities of acetaldehyde, propionaldehyde and crotonaldehyde. The weak acids and carbonyl compounds are lower utilizing the catalysts of this invention as compared to straight vanadium and phosphorus catalysts.

The dicarboxylic acid anhydrides may be recovered by a number of ways well known to those skilled in the art. For example, the recovery may be by direct condensation or by absorption in suitable media, with subsequent separation and purification of the dicarboxylic acid anhydride.

The maleic anhydride product has many well known commercial uses such as a modifier for alkyd resins.

In the following examples a quantity of 6 mm. x 6 mm. Vycor Raschig rings equivalent to about ¼ to ⅓ of the volume of the catalyst particles was loaded into the reactor on top of the catalyst particles (at the reactor inlet) to act as an inert preheat zone. The amount of catalyst composition coated on the carrier amounted to about 20 weight percent of the total weight of catalyst and carrier. In all of the examples, the percent of the copper compound is based on the total weight of $V_2O_5$ and $P_2O_5$ (or equivalent $H_3PO_4$) used. The hydrocarbon feed in all of the examples contained approximately 97 mole percent butene-2 with the remainder being $C_3$ to $C_5$ hydrocarbon impurities. Except where otherwise noted the carrier particles used were inert alumina ⅛ x ⅛ inch cylindrical alundum which had been washed with hydrochloric acid. The yields of maleic anhydride are calculated on the weight percent of maleic anhydride formed based on the weight of hydrocarbon fed. Yield values noted represent yields after the yield values had leveled out following the activation period. In all of the examples the butene concentration is based on the combined moles of air and butene.

The examples are only illustrative and are not intended to limit the invention.

*Example 1*

57.5 g. of vanadium pentoxide was added to 7 mols of hydrochloric acid at room temperature. The mixture was refluxed slowly for about 24 hours. A blue solution was obtained, showing that the vanadium had an average valence of less than plus 5. 2.0 g. of CuO was added, and the solution was refluxed for four hours. The solution was cooled to about 40° C. and 62.5 g. of $P_2O_5$ was cautiously added to the solution and the mixture was again refluxed for about 24 hours. The resulting deep blue solution was evaporated to about 250 ml. and the solution was deposited onto 480 g. of hydrochloric acid extracted ⅛ inch x ⅛ inch cylindrical alundum pellets. The carrier particles coated with the complex were then dried at low temperatures to remove the volatiles. A free flowing catalytic material was obtained which had the catalyst complex uniformly deposited on the surface of the alundum particles. The catalyst particles were then heated at 300° C. in air for a period of about one hour, with the time of heat up to 300° C. being about four hours. The coated Alundum contained 20 weight percent of the catalyst complex based on the weight of the carrier plus complex. The complex which was coated on the carrier had an atomic ratio of 1.0 vanadium, 1.4 phosphorus and 0.04 copper.

300 ml. of the catalyst were loaded into the bottom of a 3 foot long, ¾ inch I.D. nickel reactor tube surrounded by a salt bath. On top of the catalyst was loaded 100 ml. of 6 mm. x 6 mm. inert Vycor* Raschig rings to form a preheat zone. A hydrocarbon mixture containing 95 to 97 mole percent butene-2 together with the remainder being $C_3$ to $C_5$ hydrocarbon impurities was mixed with air to give a mixture containing about 0.7 mole percent butene-2. The mixture of butene and air was fed into the top of the reactor at a rate of 80 grams of butene per liter of catalyst per hour. At a salt bath temperature of 478° C. the yield of maleic anhydride was 89 weight percent based on the weight of butene fed. The maximum temperature in the reactor bed was about 500° C. The effluent from the reactor contained only 5.5 mol percent aliphatic acids of 2 to 4 carbon atoms, based on the mols of butene fed to the reactor. The maleic anhydride was recovered by bubbling the gaseous stream through water. The acids and aldehydes were determined by analysis of the scrubber water. The acids were determined by titration and the carbonyl compounds were determined by the conventional oxime method. The catalyst had long catalyst life and produced high yields for over 2000 hours.

*Example 2*

The general procedure of catalyst preparation and oxidation to maleic anhydride followed in Example 1 was repeated. The catalyst had an atomic ratio 1.45 phosphorus, 1.0 vanadium and 0.122 copper. A 3 feet long, ¾ inch I.D. nickel tube reactor was used and was loaded with 300 ml. of the catalyst. A 0.75 mol percent butene-2 in air mixture was fed through the reactor at a rate of 80 grams of butene per liter of catalyst per hour. At a salt bath temperature of 455° C. the yield of maleic anhydride was 89 weight percent based on the butene fed. This catalyst produced excellent yields for over 2500 hours.

*Example 3*

The general procedure of catalyst preparation and oxidation to maleic anhydride followed in Example 1 was repeated. The catalyst had an atomic ratio of 1.4 phosphorus, 1.0 vanadium, 0.024 copper and 0.072 lithium. The catalyst was evaluated in the same reactor used in ---
*Vycor is the trade name of Corning Glass Works, Corning, N.Y., and is composed of approximately 96 percent silica with the remaining being essentially $B_2O_3$.

Example 2 and under substantially the same conditions. At a salt bath temperature of 440° C., the yield of maleic anhydride was 92 weight percent based on the weight of butene fed to the reactor. The catalyst produced high yields of maleic anhydride for greater than 3500 hours. The weight percent weak acids was about 3 percent and the carbonyl by-products were about 6 percent, even though the reactor was operated at a high throughput of butene.

*Example 4*

The general procedure of Example 1 was repeated with the catalyst having an atomic ratio 1.0 vanadium, 1.42 phosphorus, 0.068 lithium and 0.036 copper. The lithium was added to the catalyst complex in the form of $Li_2CO_3$ and the copper was added at CuO. At a salt bath temperature of 430° C. and with a reactor having a maximum temperature in the reactor of 450° C., the yield of maleic anhydride was 87.5 weight percent based on the amount of butene fed. This reaction produced low amounts of weak acids and carbonyls and had excellent catalyst life.

*Example 5*

Example 3 was repeated with the exception that potassium was substituted for lithium in the catalyst. A catalyst producing high yields of maleic anhydride with low amounts of weak acids and carbonyls was obtained. High throughputs of butene were utilized and a long catalyst life was indicated.

The preferred catalysts are compositions having the prescribed ratios of vanadium, phosphate, copper and alkali, if employed, wherein the catalytic composition is deposited on a carrier with the vanadium being substantially in the form of a vanadyl phosphate. The average valence of the vanadium in the vanadyl radical will be less than plus 4.6. The vanadyl phosphate may be such as vanadyl orthophosphate, vanadyl hydrogen phosphate, vanadyl dihydrogen phosphate, hydrates thereof, and mixtures thereof. In these catalysts the vanadium should preferably be substantially or completely in the form of a vanadyl phosphate wherein the vanadium has an average valence of no greater than 4.3, such as about 4, at the time the catalytic composition is deposited on the carrier. The excess phosphorus, that is the phosphorus which is not combined as the vanadyl phosphate may or may not be combined with the copper in this composition prior to deposition on the carrier.

This application is a continuation-in-part of my co-pending applications Serial Number 75,655 filed December 14, 1960, entitled, "Dicarboxylic Acid Anhydride by the Catalytic Oxidation of Olefins," and Serial Number 75,680 filed December 14, 1960, entitled, "Dicarboxylic Acid Anhydride by the Catalytic Oxidation of Aliphatic Hydrocarbons."

I claim:

1. An improved process for the production of maleic anhydride from aliphatic hydrocarbons whereby high yields of maleic anhydride are obtained for prolonged periods of time and reduced amounts of carbonyls and aliphatic acids are produced, which comprises contacting the said aliphatic hydrocarbon in the vapor phase at elevated temperatures with oxygen and a vanadium-phosphorus-copper-oxygen catalyst complex, the catalyst having an atomic ratio of about 1.0 atom of vanadium to about 1.0 to 2.5 atoms of phosphorus to about 0.005 to 0.3 atom of copper, said complex having been prepared by reacting an intimate mixture of vanadium, phosphorus and copper ions.

2. An improved process for the production of maleic anhydride from unsaturated aliphatic hydrocarbons whereby high yields of maleic anhydride are obtained for prolonged periods of time and reduced amounts of carbonyls and aliphatic acids are produced, which comprises contacting the said unsaturated aliphatic hydrocarbon in the vapor phase at elevated temperatures with oxygen and a vanadium-phosphorus-copper-oxygen catalyst complex, the catalyst having an atomic ratio of about 1.0 atom of vanadium to about 1.1 to 1.8 atom of phosphorus to about 0.005 to 0.3 atom of copper, said complex having been prepared by reacting an intimate mixture of vanadium, phosphorus and copper ions.

3. An improved process for the production of maleic anhydride from butene whereby high yields of maleic anhydride are obtained for prolonged periods of time and reduced amounts of carbonyls and aliphatic acids are produced, which comprises contacting the said butene in the vapor phase at elevated temperatures with oxygen and a vanadium-phosphorus-copper-oxygen catalyst complex, the catalyst having an atomic ratio of about 1.0 atom of vanadium to about 1.2 to 1.6 atom of phosphorus to about 0.04 to 0.2 atom of copper, said complex having been prepared by reacting an intimate mixture of vanadium, phosphorus and copper ions.

4. A process for the preparation of dicarboxylic acid anhydrides which comprises contacting a gaseous mixture of an ethylenically unsaturated aliphatic hydrocarbon and oxygen at an elevated temperature with a catalyst comprising a catalytic composition of vanadium, phosphorus, oxygen and copper deposited on a carrier in an atomic ratio of about 1.1 to 1.8 atoms of phosphorus per atom of vanadium and about 0.005 to 0.3 atom of copper per atom of vanadium, the said catalyst having been prepared by reacting an intimate mixture of vanadium, phosphorus and copper ions and depositing on the carrier the said catalytic composition wherein the vanadium has an average valence of no greater than 4.6 at the time of the deposition of the composition on the carrier, and thereafter drying the catalytic composition on the carrier.

5. A process for the preparation of dicarboxylic acid anhydrides which comprises contacting a gaseous mixture of an ethylenically unsaturated aliphatic hydrocarbon and oxygen at an elevated temperature with a catalyst comprising a catalytic composition of vanadium, phosphorus, copper, oxygen and a metal of Group Ia of the Periodic Table deposited on a carrier in an atomic ratio of about 1.1 to 2.5 atoms of phosphorus per atom of vanadium, about 0.005 to 0.3 atom of copper per atom of vanadium, and about 0.003 to 0.2 atom of a metal of Group Ia per atom of phosphorus, the said catalyst having been prepared by reacting an intimate mixture of vanadium, phosphorus and copper ions and depositing on the carrier the said catalytic composition wherein the vanadium is a cation and has an average valence of no greater than 4.3 at the time of the deposition of the composition on the carrier, and thereafter drying the catalytic composition on the carrier.

6. A process for the preparation of maleic anhydride which comprises contacting a gaseous mixture of butene and oxygen at an elevated temperature with a catalyst comprising a catalytic composition of vanadium, phosphorus, oxygen and copper deposited on a carrier in an atomic ratio of about 1.2 to 1.6 atoms of phosphorus per atom of vanadium and 0.005 to 0.3 atom of copper per atom of vanadium, the said catalyst having been prepared by reacting a solution of vanadium cations of an average valence of about plus four with phosphate anions and copper cations and thereafter depositing the resulting solution of the reaction product on the said carrier when the vanadium has an average valence of no greater than about 4.3.

7. A process for the preparation of maleic anhydride which comprises contacting a gaseous mixture of butene and oxygen at an elevated temperature with a catalyst comprising a catalytic composition of vanadium, phosphorus, copper, oxygen and a metal of Group Ia of the Periodic Table deposited on a carrier in an atomic ratio of 1.1 to 1.8 atoms of phosphorus per atom of vanadium, 0.01 to 0.20 atom of copper per atom of vanadium and about 0.003 to 0.1 atom of a metal of Group Ia per atom of phosphorus, the said catalyst having been prepared by reacting a solution of vanadium cations wherein the average valence of the vanadium is less than 4.6 with a phosphorus compound soluble in the solution of the vanadium cations and copper and Group Ia metal cations and thereafter depositing the resulting solution of the reaction product on the said carrier when the vanadium has an average valence of about four.

8. A process for the preparation of maleic anhydride which comprises contacting a gaseous mixture of butene and oxygen at an elevated temperature with a catalyst comprising a catalytic composition of vanadium, phosphorus, oxygen and copper deposited on a carrier in an atomic ratio of about 1.1 to 2.5 atoms of phosphorus per atom of vanadium and about 0.005 to 0.3 atom of copper per atom of vanadium, the said catalyst having been prepared by dissolving a vanadium compound having an average valence of the vanadium of greater than 4.6 in a reducing solvent to reduce the valence of the vanadium to a valence of no greater than 4.3 and to dissolve the vanadium compound, adding the phosphorus and copper atoms to the reduced vanadium and thereafter depositing the resulting solution of the reaction product on the said carrier when the vanadium has an average valence of no greater than 4.3.

9. A process for the preparation of maleic anhydride which comprises contacting a gaseous mixture of butene and oxygen at an elevated temperature with a catalyst comprising a catalytic composition of vanadium, phosphorus, copper, oxygen and a metal of Group Ia of the Periodic Table deposited on a carrier in an atomic ratio of about 1.1 to 1.8 atoms of phosphorus per atom of vanadium, about 0.005 to 0.3 atom of copper per atom of vanadium and about 0.003 to 0.2 atom of a metal of Group Ia per atom of phosphorus, the said catalyst having been prepared by dissolving a vanadium compound having a valence of the vanadium of five in a reducing solvent to reduce the average valence of the vanadium to less than 4.3 and to dissolve the vanadium compound, adding the phosphorus and copper atoms to the reduced vanadium and thereafter depositing the resulting solution of the reaction product on the said carrier when the vanadium has an average valence of less than 4.3.

10. A process for the preparation of maleic anhydride which comprises contacting a gaseous mixture of butene and oxygen at an elevated temperature with a catalyst comprising a catalytic composition of vanadium phosphorus, oxygen and copper deposited on a carrier in an atomic ratio of about 1.2 to 1.6 atoms of phosphorus per atom of vanadium and about 0.01 to 0.2 atom of copper per atom of vanadium, the said catalyst having been prepared by dissolving vanadium pentoxide in an aqueous solution of a reducing acid to form an aqueous solution of a vanadium oxysalt wherein the salt forming anion of the vanadium oxysalt is the anion of the said reducing acid and the salt forming anion is more volatile than the phosphate anion and wherein the vanadium in the vanadium oxysalt has an average valence of no greater than 4.3, adding phosphorus and copper atoms to the reduced vanadium and thereafter depositing the resulting solution of the reaction product on the said carrier when the vanadium has an average valence of no greater than 4.3.

11. A process for the preparation of dicarboxylic acid anhydrides which comprises contacting a gaseous mixture of an ethylenically unsaturated aliphatic hydrocarbon and oxygen at an elevated temperature with a catalyst comprising a catalytic composition of vanadium, phosphorus, oxygen and copper deposited on a carrier in an atomic ratio of about 1.1 to 1.8 atoms of phosphorus per atom of vanadium and about 0.005 to 0.3 atom of copper per atom of vanadium, the said catalyst having been prepared by depositing on the carrier a composition comprising vanadyl phosphate wherein the vanadium has an average valence of less than 4.6 at the time of the deposition of the vanadyl phosphate on the carrier, and thereafter drying the catalytic composition on the carrier.

12. A process for the preparation of maleic anhydride which comprises contacting a gaseous mixture of butene and oxygen at an elevated temperature with a catalyst comprising a catalytic composition of oxides of vanadium, phosphorus, copper, oxygen and a metal of Group Ia of the Periodic Table deposited on a carrier in an atomic ratio of 1.2 to 1.6 atoms of phosphorus per atom of vanadium and about 0.04 to 0.2 atom of copper per atom of vanadium, the said catalyst having been prepared by dissolving a vanadium compound having an average valence of the vanadium of about five in hydrochloric acid to reduce the average valence of the vanadium to no greater than 4.6 and to dissolve the vanadium compound, adding phosphorus and copper atoms to the reduced vanadium and thereafter depositing the resulting solution of the reaction product on the said carrier when the vanadium has an average valence of less than 4.6, and thereafter drying the said resulting solution on the said carrier followed by oxidation of the deposited composition to the oxides.

References Cited by the Examiner

UNITED STATES PATENTS

| | | | |
|---|---|---|---|
| 2,496,621 | 2/1950 | Deery | 252—437 |
| 2,773,838 | 12/1956 | Reid et al. | 252—437 |
| 2,773,921 | 12/1956 | Rylander et al. | 260—683.15 |
| 2,920,049 | 1/1960 | Romanousky et al. | 252—437 |
| 2,938,874 | 5/1960 | Rosinski | 252—437 |
| 2,959,600 | 11/1960 | Houben | 260—346.8 |
| 2,992,236 | 7/1961 | Bavley et al. | 260—346.8 |

NICHOLAS S. RIZZO, *Primary Examiner.*

HENRY R. JILES, *Assistant Examiner.*